United States Patent [19]

Rahn

[11] Patent Number: 5,892,564
[45] Date of Patent: Apr. 6, 1999

[54] EYEGLASS HEADPHONE COMBINATION

[76] Inventor: Henry J. Rahn, 212 McKinley Pl., Ridgewood, N.J. 07450

[21] Appl. No.: 914,360

[22] Filed: Aug. 19, 1997

[51] Int. Cl.[6] .................................................... G02C 1/00
[52] U.S. Cl. .................................................... 351/158
[58] Field of Search ........................... 351/158; 455/350, 455/351; 381/187, 188

[56] References Cited

U.S. PATENT DOCUMENTS

| | | | |
|---|---|---|---|
| 4,453,050 | 6/1984 | Enokido | 179/182 |
| 4,856,086 | 8/1989 | McCullough | 455/344 |
| 4,882,769 | 11/1989 | Gallimore | 455/344 |
| 4,901,355 | 2/1990 | Moore | 381/183 |
| 4,902,120 | 2/1990 | Weyer | 351/158 |
| 5,335,285 | 8/1994 | Gluz | 381/187 |
| 5,606,743 | 2/1997 | Vogt et al. | 351/158 |

*Primary Examiner*—Huy Mai
*Attorney, Agent, or Firm*—Mandel & Peslak; Arthur Peslak

[57] ABSTRACT

An integral eyeglass headphone combination is disclosed. The headphones are mounted to the temple piece of the eyeglass frame. The combination provides for adjustment by the user of the position of the earphones in a manner that provides for maximum comfort.

3 Claims, 5 Drawing Sheets

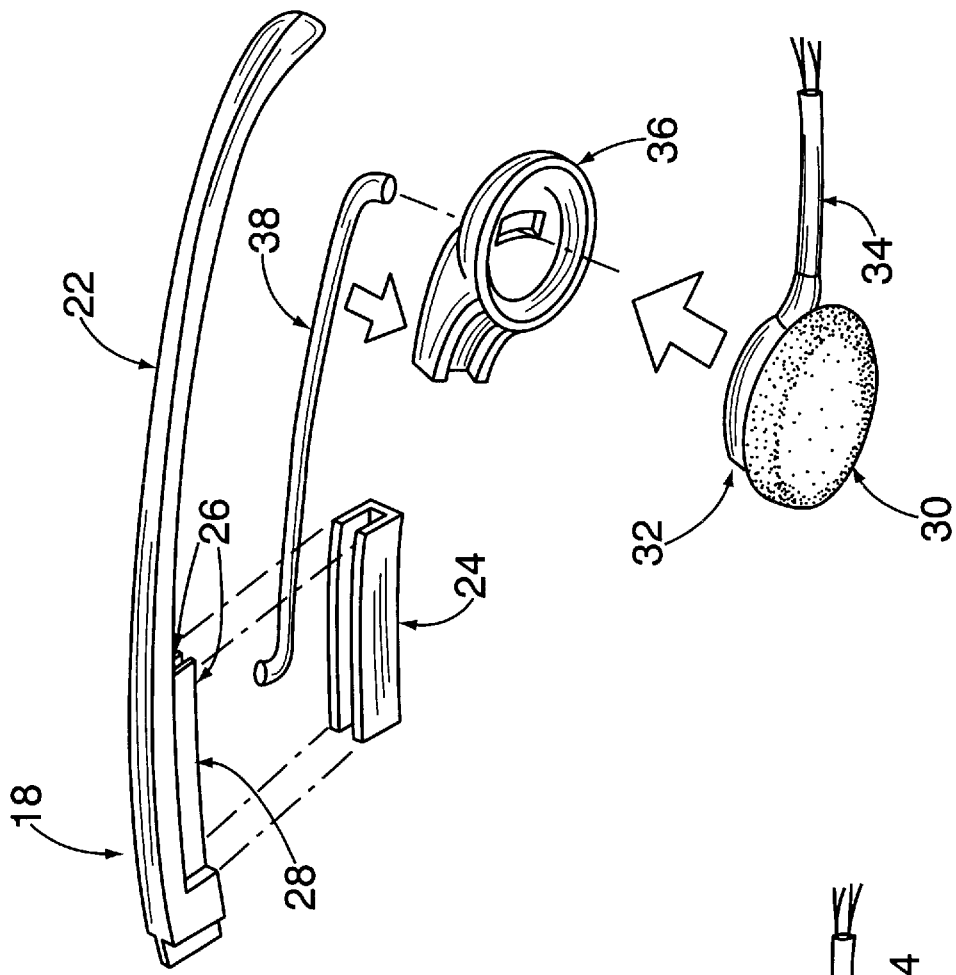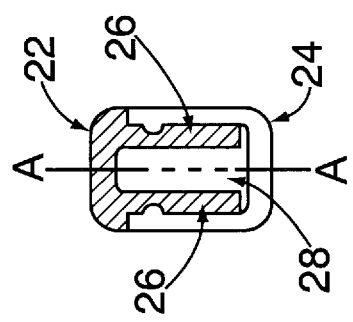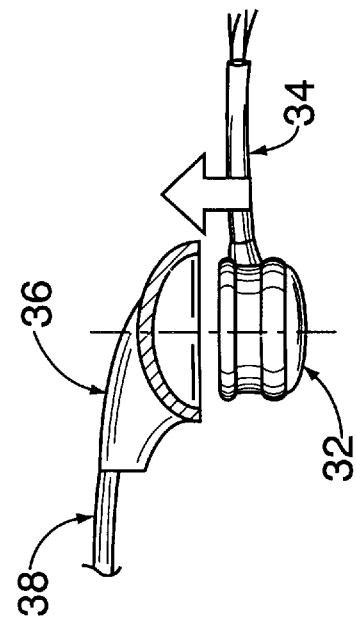

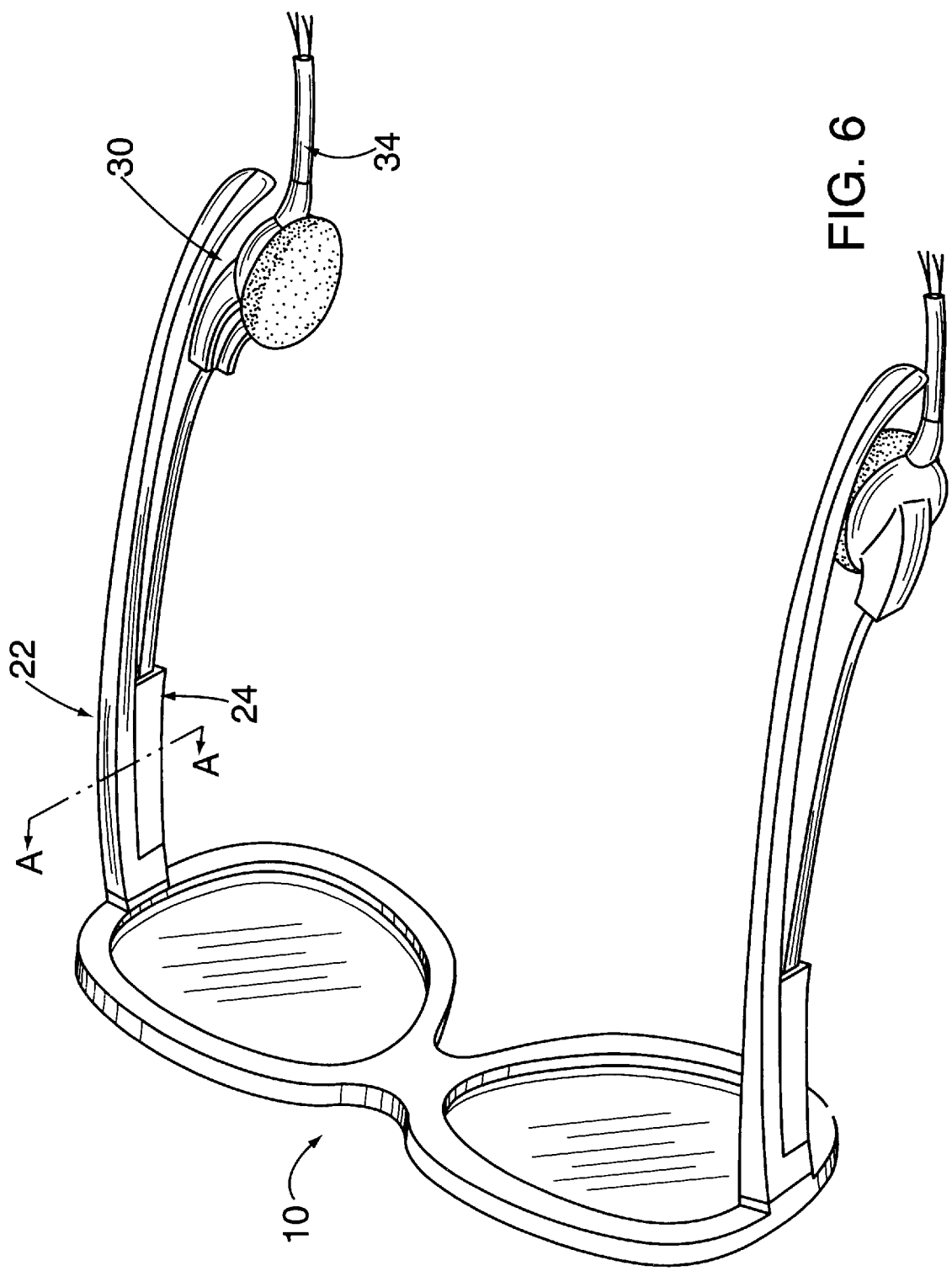

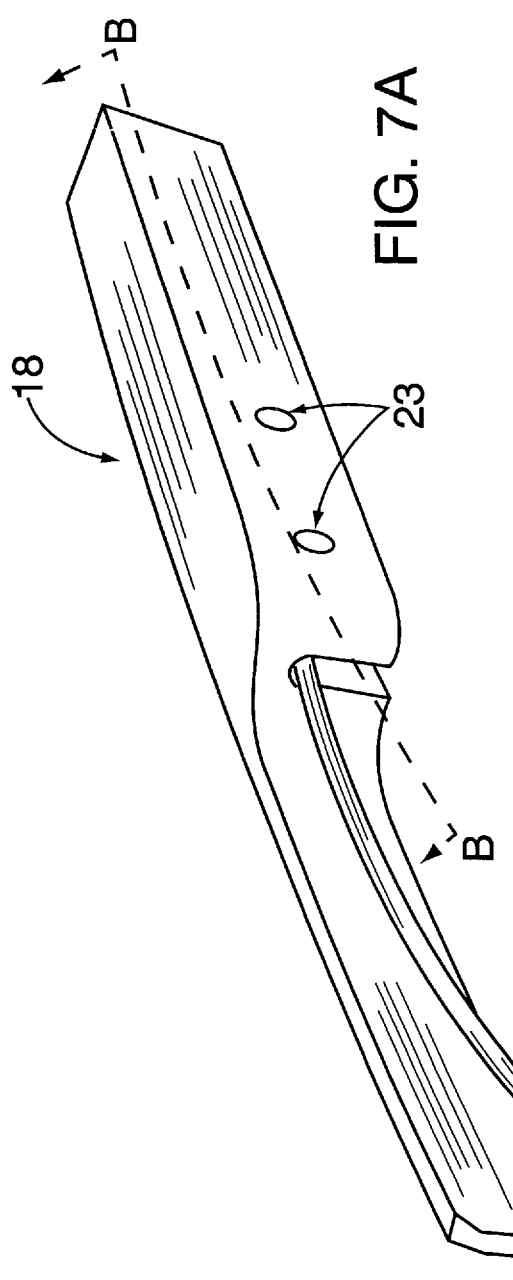
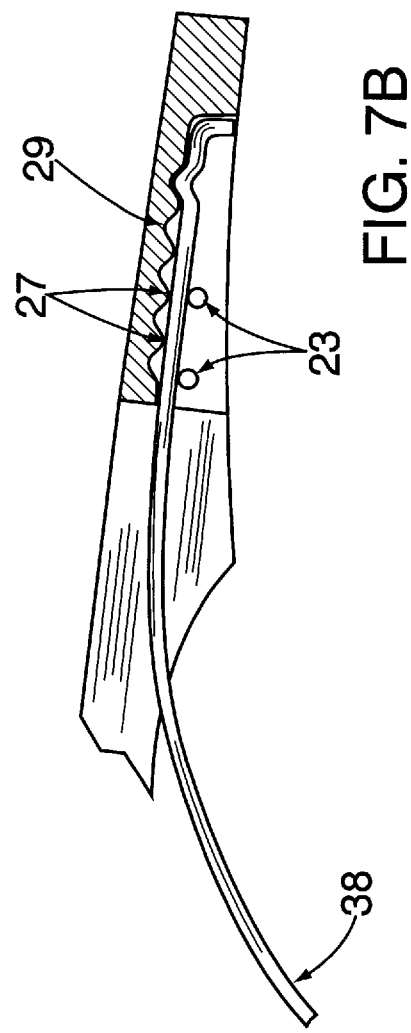

EYEGLASS HEADPHONE COMBINATION

BACKGROUND OF THE INVENTION

The present invention is directed to a combination of two items that have for the most part been manufactured and sold as separate items. The present invention is directed to a combination of eyeglasses with an integral headphone comprising an appropriate connection jack for use in connection with an audio or video device. The types of glasses can be eyeglasses with tinted lenses, prescription eyeglasses or glasses with plain clear lenses.

There have been several prior unsatisfactory attempts to combine headphones with eyeglasses. Some prior devices have been designed in an attempt to incorporate a radio into the eyeglass frames. The present invention is not directed to a radio integrated in the eyeglass frames but rather a combination of headphone and glasses whereby the headphone will be readily adapted to be functionally connected to any sort of audio or video device. An example of such a device would be a portable radio, cassette player or CD player.

Several of the prior attempts at combining headphones and eyeglasses have been directed to a headphone designed with some sort of mechanism such as a clamp that allows attachment to any sort of eyeglass frame. However, these devices have suffered from the disadvantage that the connecting mechanism is awkward to fit and adjust to the head of the wearer as well as the devices being relatively heavy. This situation leads to a generally loose and shaky fit. In addition, there is no effective way to adjust the pressure exerted by the headphone on the wearer's ears. Consequently, the headphones become uncomfortable for the wearer in a very short period of time.

In a prior device where it was attempted to combine the eyeglasses with the headphones in a single piece, the device failed to provide a proper adjustment means for the headphones. Thus, this type of device has also proved to be uncomfortable to the user.

SUMMARY OF THE INVENTION

The present invention is directed to an integral eyeglass frame and headphone combination that solves the problems with prior combinations. The present invention is directed to an integral eyeglass frame and headphone combination wherein the headphones are designed as an integral portion of the temple pieces on the eyeglass frames. The combination of the present invention allows for forward and back adjustment of the headphones to adjust to the position of the wearer's ears. The present invention also comprises a means for allowing the headphone position to be fixed after the wearer adjusts the front to back position. The present invention also comprises a novel means of providing a slight spring force for comfortably holding the earphones in position against the ear canal. The connection of the earphone to the temple piece of the frames will also allow for a slight swivel movement for further comfortable adjustment by the wearer. Due to the several adjustments in position allowed with the present invention as well as the spring force, the problems noted with the prior devices are solved. Consequently, the present invention provides a lightweight combination of eyeglasses and headphones that can be readily adjusted by the wearer for complete comfort during use.

The present invention is more particularly directed to an integral eyeglass headphone combination comprising an eyeglass frame comprising a frame in which lenses are mounted and temple pieces connected to an extension of the frame; an earphone assembly comprising an earphone, an earphone wire connected to the earphone, a housing connected to the earphone, and an arm connected to the housing; and means for adjustably connecting the arms to the temple pieces.

BRIEF DESCRIPTION OF THE DRAWINGS

FIG. 2 is an exploded view illustrating a portion of the embodiment illustrated in FIG. 1.

FIG. 3 is a cross-sectional view taken along line A—A in FIGS. 1, 5 and 6.

FIG. 4 is a plan view of a portion of the embodiment illustrated in FIG. 1.

FIG. 6 is a plan view illustrating an alternate embodiment of the present invention.

FIG. 7A is a partial plan view of a portion of the embodiment illustrated in FIG. 1.

FIG. 7B is a cross-sectional view taken along line B—B in FIG. 7A.

DETAILED DESCRIPTION OF THE INVENTION

Figure 1:
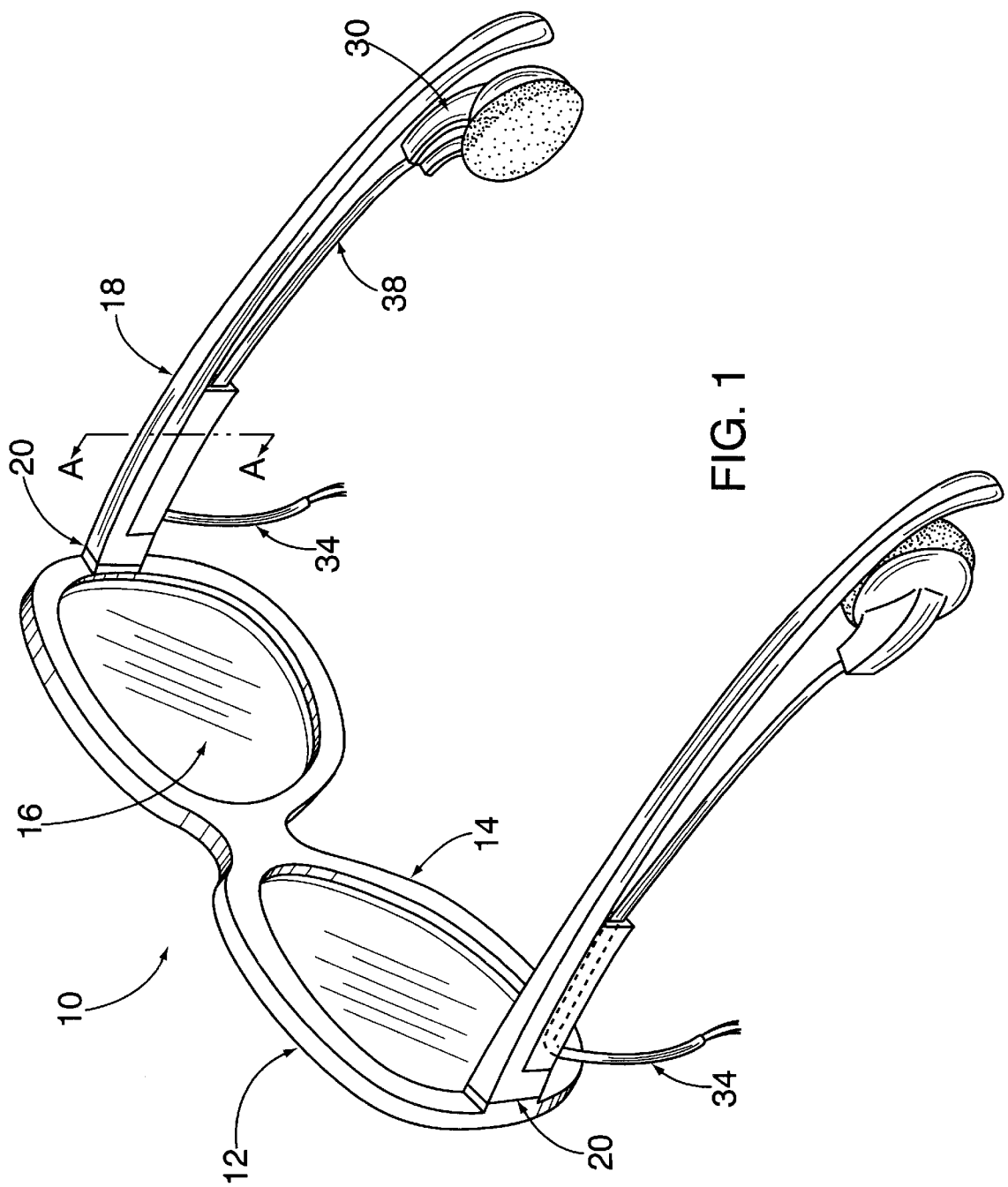
FIG. 1 is a plan view illustrating an embodiment of the present invention.

The present invention is directed to an integral eyeglass headphone combination as generally illustrated in the Figures. The eyeglass frames 12 generally are comprised of a frame 14 containing the lenses 16 and two temple pieces 18. The temple pieces 18 are each connected to the frame 14 by means of a hinge 20. Although the embodiment described herein provides for a hinge 20 between the temple pieces 18 and the frame 14, those of ordinary skill in the art will recognize that the present invention can also be readily adapted to eyeglass frames wherein the temple pieces 18 and the frame 14 are formed from one-piece without the necessity of the hinge 20. The hinge 20 allows the temple pieces 18 to be folded into position parallel to the frame 14 or perpendicular to the frame 14 as shown in FIG. 1.

The general means of assembly of the temple pieces 18 is illustrated in FIG. 2. The temple piece 18 comprises a temple arm piece 22 and a cover 24. The temple arm piece comprises two walls 26 that form an integral slot 28. As shown in detail in FIG. 3, the cover 24 will be held in place by a frictional fit over the integral slot 28.

The present invention also comprises a speaker assembly 30 as illustrated in FIGS. 2 and 4. The speaker assembly comprises an earphone 32 with earphone wire 34. The earphone wire 34 will be adapted to be functionally received in an audio or video device. The earphone 32 will be mounted in a housing 36 by means of a snap fit or as an alternative the earphone 32 and housing 36 will be formed as an integral unit such as by bonding. An arm 38 will be connected to the rear of housing 36 by means of a snap fit or other method. In the embodiment illustrated in FIG. 2, the arm 38 will be held in place on the temple 18 by means of a frictional fit under cover 24. As shown in FIGS. 7A and 7B, the slot 28 will have an indexed surface 29 comprising a plurality of ridges 27. The cover 24 will have a plurality of metal pins 23 fit therein. The user will move the arm 38 at a position along the longitudinal axis of temple 18 at a position that would comfortably fit the user's ear position by moving the arm back and forth. The arm 38 will be held in place by the ridges 27. Those of ordinary skill in the art will recognize that the positioning of the arm 38 can be accomplished by other means without departing from the spirit or scope of the present invention. For example, the arm 38 could be fitted with some sort or ball on its end that would fit into a depression in the walls 26 forming the groove 28 with the cover 24 still holding the arm 38 in the proper position.

Figure 5:
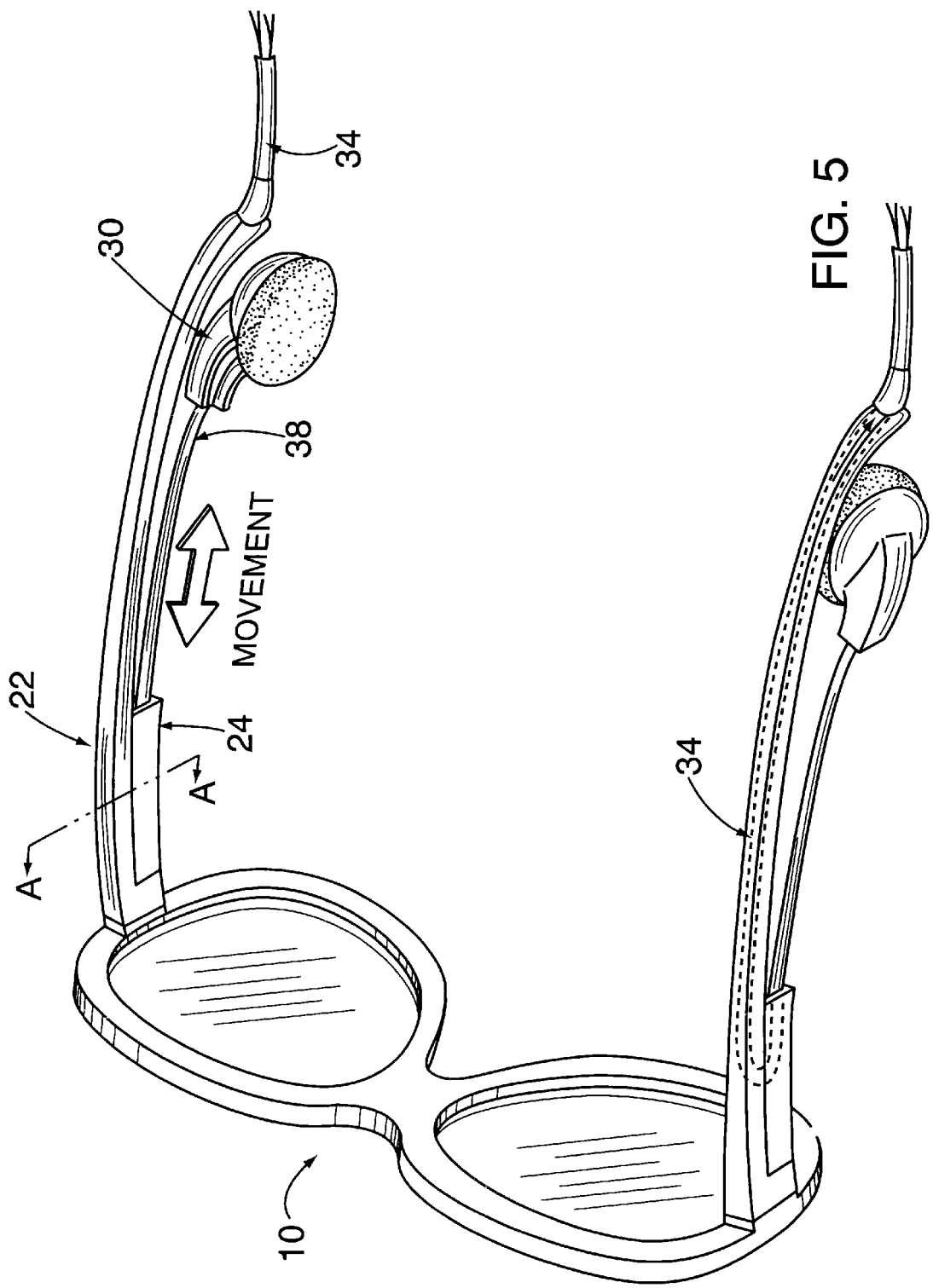
FIG. 5 is a plan view illustrating an alternate embodiment of the present invention.

The temple piece 18 of the present invention also provides a means to effectively manage the placement and position of the earphone wire 34. One method of placing the wire 34 would be to place the wire 34 such that it will run forward through groove 28 and out toward the hinge 20 as shown in FIG. 1. The second method, illustrated in FIG. 5, is to run the wire 34 forward in groove 28 and then loop the wire 34 so that it exits from the rear of the groove 28 in the direction of the earphone 32. The third method, illustrated in FIG. 6, is to allow the wire 34 to merely run from the rear of earphone 32 without being independently connected to the temple piece 18.

The arm 38 is designed to be fabricated from a flexible semi-rigid material. One object of using such a material is to take advantage of the slight spring force created by the material. In this way, the spring force will be directed toward the user so that the earphone 32 will be held comfortably in position over the user's ear canal. As noted above, the arm 38 will slide longitudinally in the groove 28 however, the fit of the arm 38 into the groove 28 will prevent the arm 38 and also the earphone 32 from rotating about its axis. The prevention of rotation of the arm 38 is important to maintain the comfort of the user. However, the connection of the arm 38 to the housing 36 could provide for a slight pivoting motion so that the earphone 32 will comfortably fit the angle of the user's ear canal.

Those of ordinary skill in the art will recognize that the embodiments just described merely illustrate the principles of the present invention. Many modifications may be made thereto without departing from the spirit and scope of the invention as set forth in the following claims.

What is claimed is:

1. An integral eyeglass headphone combination comprising:
   a) an eyeglass frame comprising a frame in which lenses are mounted and temple pieces connected to an extension of the frame;
   b) an earphone assembly comprising an earphone, an earphone wire connected to the earphone, a housing connected to the earphone, and an arm connected to the housing wherein the arm comprises a semi-rigid material that provides a slight spring force to hold the earphone in place in a user's ear; and
   c) means for adjustably connecting the arms to the temple pieces wherein the means for adjustably connecting the arms to the temple pieces comprises means for adjusting the position of the arm to a location determined by the user and for securing the arms in the location selected by the user.

2. The integral eyeglass headphone combination of claim 1 wherein the means for adjustably connecting the arms to the temple pieces further comprises a longitudinal groove integral with the temple pieces for slidably receiving the arm and a cover to be frictionally fit over the groove wherein said cover is removeable by the user so that the arm may be located in the location determined by the user and then the cover replaced in position and thereby the arm is secured in the location determined by the user.

3. The integral eyeglass headphone combination of claim 2 wherein the earphones are pivotably connected to the arm to provide for angular adjustment to comfortably fit the angle of the user's ear canal.

* * * * *